(12) United States Patent
Silva

(10) Patent No.: US 11,188,706 B2
(45) Date of Patent: Nov. 30, 2021

(54) SYSTEM AND METHOD FOR REGIONALIZED RESOLUTION OF A NETWORK PATH

(71) Applicant: Christopher Anthony Silva, Fair Haven, NJ (US)

(72) Inventor: Christopher Anthony Silva, Fair Haven, NJ (US)

(*) Notice: Subject to any disclaimer, the term of this patent is extended or adjusted under 35 U.S.C. 154(b) by 256 days.

(21) Appl. No.: 16/009,682

(22) Filed: Jun. 15, 2018

(65) Prior Publication Data
US 2019/0220499 A1 Jul. 18, 2019

Related U.S. Application Data

(63) Continuation-in-part of application No. 15/935,686, filed on Mar. 26, 2018.
(Continued)

(51) Int. Cl.
| | | |
|---|---|---|
| G06F 17/00 | (2019.01) | |
| G06F 7/00 | (2006.01) | |
| G06F 40/103 | (2020.01) | |
| G06F 16/951 | (2019.01) | |
| G06F 16/9537 | (2019.01) | |
| G10L 15/22 | (2006.01) | |
| G10L 15/26 | (2006.01) | |

(52) U.S. Cl.
CPC .......... *G06F 40/103* (2020.01); *G06F 16/951* (2019.01); *G06F 16/9537* (2019.01); *G10L 15/26* (2013.01); *G10L 2015/223* (2013.01)

(58) Field of Classification Search
CPC .. G06F 40/103; G06F 16/9537; G06F 16/951; G10L 15/265; G10L 15/26; G10L 2015/223
USPC ........................................................ 707/756
See application file for complete search history.

(56) References Cited

U.S. PATENT DOCUMENTS 6,618,726 B1 9/2003 Colbath et al.
6,965,864 B1 11/2005 Thrift et al.
(Continued)

OTHER PUBLICATIONS

International Search Report, PCT/US2018/043838 dated Oct. 5, 2018.
International Search Report, PCTUS2018/41923 dated Oct. 1, 2018.

*Primary Examiner* — Pavan Mamillapalli
(74) *Attorney, Agent, or Firm* — Porzio Bromberg & Newman P.C.

(57) ABSTRACT

A system and method for regionalized resolution of a network path to one or more file types based on a specific sound or a specific combination of words, phrases and/or sounds. An application with a user interface at a networked device has access to a remote speech to text server via an advanced programmer interface (API) and to a regionalized, accessible database. The regionalized, accessible database can contain text translations of distinct words, phrases, and sounds along with region(s) where the entries are valid that are associated with distinct network paths. Converted audio in a searchable format and location of the networked device are queried at the global database for a match, if a match is found at the regionalized database for the query, the network path associated with the match is returned from the regionalized database to the networked device, and one or more files associated with the returned network path are opened at the networked device.

22 Claims, 3 Drawing Sheets

Related U.S. Application Data

(60) Provisional application No. 62/619,054, filed on Jan. 18, 2018, provisional application No. 62/619,054, filed on Jan. 18, 2018.

(56) References Cited

U.S. PATENT DOCUMENTS

| | | | |
|---|---|---|---|
| 7,536,639 | B2 | 5/2009 | Griswold et al. |
| 7,707,308 | B1* | 4/2010 | Hogge, Jr ............... H04L 69/40 |
| | | | 709/239 |
| 8,032,383 | B1 | 10/2011 | Bhardwaj et al. |
| 8,712,778 | B1* | 4/2014 | Thenthiruperai ....... G10L 15/22 |
| | | | 704/270.1 |
| 9,202,219 | B2* | 12/2015 | Van Der Linden .... G06Q 30/02 |
| 10,019,988 | B1 | 7/2018 | Chan et al. |
| 10,037,545 | B1* | 7/2018 | Huang ............... G06Q 30/0251 |
| 10,365,887 | B1* | 7/2019 | Mulherkar .............. G06F 3/167 |
| 2002/0052912 | A1 | 5/2002 | Griswold et al. |
| 2002/0057678 | A1* | 5/2002 | Jiang ................... H04M 7/0024 |
| | | | 370/353 |
| 2003/0004724 | A1 | 1/2003 | Kahn et al. |
| 2007/0124149 | A1* | 5/2007 | Shen ....................... G10L 15/26 |
| | | | 704/275 |
| 2007/0130014 | A1* | 6/2007 | Altberg .............. G06Q 30/0273 |
| | | | 705/14.69 |
| 2008/0243517 | A1 | 10/2008 | Muschett et al. |
| 2013/0346077 | A1* | 12/2013 | Mengibar ........... G06F 16/3344 |
| | | | 704/235 |
| 2014/0089419 | A1 | 3/2014 | Morris |
| 2014/0163984 | A1 | 6/2014 | Dai et al. |
| 2014/0325354 | A1* | 10/2014 | Zhang ................... G06F 3/0488 |
| | | | 715/716 |
| 2015/0058016 | A1 | 2/2015 | Goldstein |
| 2015/0066479 | A1 | 3/2015 | Pasupalak et al. |
| 2018/0329896 | A1 | 11/2018 | Goethals et al. |
| 2019/0057692 | A1 | 2/2019 | Fry |

\* cited by examiner

SYSTEM AND METHOD FOR REGIONALIZED RESOLUTION OF A NETWORK PATH

BACKGROUND OF THE INVENTION

Field of the Invention

The present invention relates to a system and method for regionalized resolution of a network path to one or more file types based on a specific sound or a specific combination of words, phrases and/or sounds and a physical location of a user.

Description of Related Art

Users of networks have several conventional ways to access a destination path via a plurality of devices such as personal computers, tablets, and mobile devices. Within those networked devices, there is a plurality of applications that are used to open various file types that can exist at these network paths such as, but not limited to, image viewers, document readers, spreadsheet applications, media players, development applications, presentation applications, and the like. A user can either type in the network path of the location of the file or files, browse to the location through a network hierarchy of servers and nested folders within those servers, or use a shortcut that stores the network path. When the file is accessed, the default application associated on the networked device for that file type opens the application. Conventional approaches have the limitation that the efficiencies of accessing these files is limited to existing methodologies within specific applications. The path will always provide the user with the same result regardless of the user's location. Additionally, conventional approaches do not take into account a location of the user.

U.S. Pat. No. 7,536,639 describes a numeric/voice name internet access architecture for accessing internet addresses based on a request from a wireless device. A Web Num system specifies a Private Numbering System that allows users to reach Internet Web sites by entering numbers instead of text Web URLs and host names on cellular telephones and other wireless Internet devices (WID). The Private Numbering System uses numerical digits, including specially-designated numeric combinations, standard telephone numbers, and international telephone numbers, that directs Web-enabled cell phones and WIDs to Internet Web sites and other Internet resources. A special WebNum database maps each WebNum back to an Internet URL, and interprets the WebNum as a pointer to an Internet resource.

U.S. Pat. No. 6,618,726 ('726 patent) describes a voice activated web browser to control a single application within a network connected device with a web browser and microphone. The '726 patent describes that speech is first categorized into "micro-domains" and then un-categorized words are further grouped into word groups. It is the intent to allow a user to speak into the microphone with natural language, i.e. complete sentences, and retrieve a result from a speech detention process. The '726 patent is directed to words and phrases comprising a plurality of templates associated with specific areas of interest. The match must be considered representing at least one of the specific areas of interest or it must generate a search string comprising: classifying parts of said identified words and phrases as at least one of names of people, locations, organizations, times, dates and amounts of money, marking all other words in said identified words and phrases as extraneous words.

Conventional Web browsers have provided access to World Wide Web pages on the internet by use of website bookmarks. Conventional Web browsers allow a user to save, or bookmark, a web page. The URL of the web page selected is saved locally to Web browser data, and the user can create a custom alphanumeric name for that bookmark if desired.

U.S. Pat. No. 6,965,864 ('864 patent) describes a voice activated hypermedia system using grammatical metadata. The '864 patent relates to a technique for embedding voice activated control information in HTML pages delivered on the World Wide Web. The '864 patent teaches controlling a Web browser via speech. The system uses, continuous, speaker independent speech recognition to allow anyone to walk up and use the system naturally without training. Bookmarks within the Web browser can be customized by the user to have a corresponding speech identifier via a "Hot List". The user can create these tags to have an association that is familiar to them, therefore they would be less likely to forget.

It is desirable to provide simplified regionalized access by more than one user to one or more files associated with a respective network path that is agnostic to the application required to open the destination.

SUMMARY OF THE INVENTION

The present invention simplifies regionalized access to all file types through a single interface. Conventional networks, whether internet or intranet, are a series of interconnected endpoints which contain data, allow access to data, access data, or any combination thereof. It has been found that users are frequently presented the challenge of remembering and organizing the location of data. Data can be located in nested folders on other workstations, servers, storage arrays, cloud storage, websites, file transfer protocol servers, and any other networked device that has the capacity to store data. Specific applications are often needed to open various file types stored in these locations. As such, conventional "bookmarks" may exist in specialized applications such as web browsers, but that does not assist the users to access all file types through a single interface. Conventional "bookmarks" are also user driven and customized for that particular as to which bookmarks may be relevant to open in a particular application. "Bookmarks" are also global in nature, and do not change the destination based on the user's location.

The present invention relates to a system and method for regionalized resolution of a network path to one or more file types based on a specific sound or a specific combination of words, phrases and/or sounds and a location of the user using the networked device. The present invention includes an application with a user interface, access to a remote speech to text server via an advanced programmer interface (API), and a globally accessible database. The globally accessible database can contain text translations of distinct words, phrases, and sounds that are associated with distinct network paths to an endpoint, or any item contained on an endpoint, and a discrete region(s) for which they are valid. Multiple words, phrases and sounds along with a chosen region or region(s) can be associated with a single network path. The application with a user interface can be an executable program running on a networked device containing components such as a processor, memory, storage, microphone, location acquisition module such as a global Positioning System (GPS), and operating system. The application with a user interface can be started by the user manually, or automatically on the networked device. The user can speak a word, phrase, or sound into the microphone of the networked device. The application with a user interface can connect to the remote speech to text server via the API and send the audio in digital or analog format to the remote speech to text server along with alocation of the user using the networked device. The remote speech to text server can return the result to the networked device. Alternatively, the remote speech to text server can return the result directly to the regionalized accessible database for query against entries within the database. If a match is found, the network path associated with the phrase, word, or sound is transmitted to the application with user interface. At the application with user interface, the network path target is opened using a default application assigned to the file type within the operating system of the networked device running the application with user interface.

An example embodiment can be directed to multiple users working collaboratively on a single file, such as a presentation or document. The regionalized accessible database contains a word, phrase, or sound known to all users who need to access the file. The users can speak the word, phrase, or sound into the microphone of the networked device, such as a personal computer. The sound can be converted by a speech to text engine, and the result can be compared via a query in the commonly accessible database. In one embodiment, a server uses sound maps to transcribe one or more sounds into a searchable format. In another embodiment, the speech is analyzed by a third party speech to text engine at the networked device. If a match is found to the analysis result and a location of the user using the networked device, the network path of that file can be delivered to the networked device, and the default application for that file type, which is managed by the networked device operating system, is opened with the file. Alternatively, the networked device operating system can automatically open the file determined from the network path of the file. For example, the file can be a DOC file which is a document file format used by Microsoft Word, and also used with word processing software, including OpenOffice. A DOC file can contain formatted text, images, tables, graphs, charts, page formatting, and print settings. In this embodiment, the operating system can automatically open the document with Microsoft Word on the networked device and present the file to the user within the networked device user interface.

In an additional example embodiment, the network path delivered to the networked device can be a shared folder on the network, root access to a server or a workstation, or a telephone number. The present invention has the advantages of simplification and efficiency to access data through a user interface.

The invention will be more fully described by reference to the drawings.

DETAILED DESCRIPTION

Figure 1:
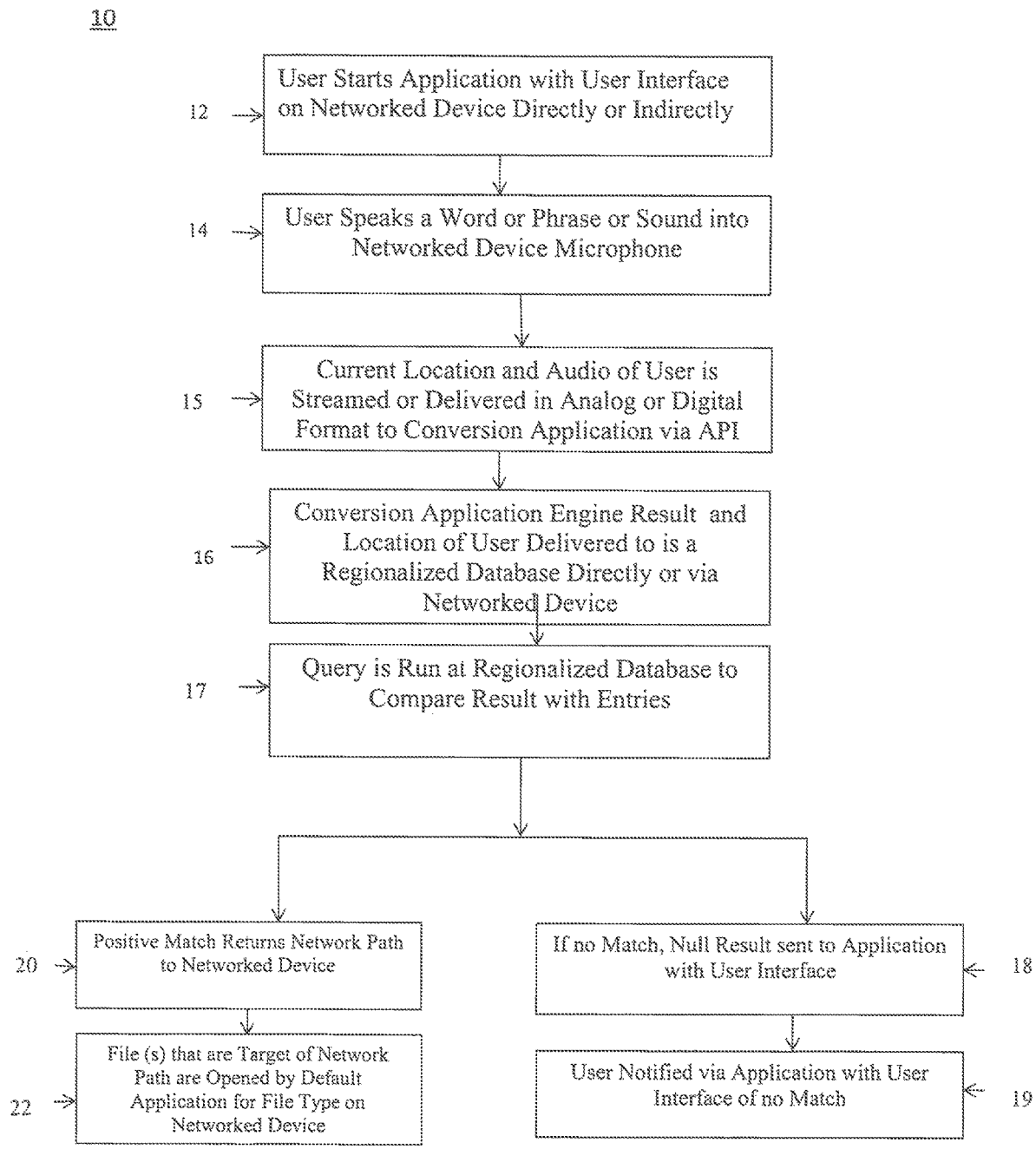
FIG. 1 is a schematic diagram of a flow chart of a method for regionalized resolution of a network path to one or more file types based on a specific sound or a specific combination of words, phrases and/or sounds resolution, and the user's location.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a flow chart of a method for global resolution of a network path 10. In block 12, a user starts an application with a user interface on a networked device The application with a user interface can be started by the user manually, or automatically on the networked device. The application with a user interface can be an executable program running on a networked device. The networked device can include components such as a processor, memory, storage, microphone, location acquisition module, and operating system. For example, the networked device can be a laptop, smart phone, AI assistant or tablet. The network can be the internet or a local area network. In another embodiment, the application is embedded into networked devices of an Artificial Intelligence (AI) assistant such as Microsoft Cortana, Apple Siri, Amazon Alexa, Google assistant, and the like. The embodiments can have a visual and/or audible user interface to the application.

In block 14, a user provides one or more sounds or speaks one or more words or phrases into a microphone of the networked device. Alternatively, the user can provide a sound into the microphone of the networked device.

In block 15, audio and a location of the user from the application is delivered in real time from the application to a conversion application via the advanced programmer interface (API). The location of the user can be determined by GPS. For example, the audio can be streamed. Alternatively, the audio from the application and the location of the user is delivered in audio data file format to the conversion application. The conversion application can converts the audio to text. For example, the conversion application can use a speech to text conversion via the advanced programmer interface (API) to transcribe the audio received from the application into text. In one embodiment, the application with a user interface can connect to the remote speech to text server via the advanced programmer interface (API) directly or indirectly. The remote speech to text server running the conversion application. The speech to text server can be a third party speech to text server. Alternatively, the conversion application can utilize phonetic sound maps to transcribe audio of one or more sounds into a searchable format.

In block 16, the result of the conversion application and the location of the user is delivered to a regionalized database. The result can be delivered directly from the conversion application. Alternatively, the result can be forwarded to the regionalized database via the networked device.

In block 17, a query is run at the regionalized database to compare the converted speech and/or one or more sounds along with the location of the user with entries of the regionalized database in order to locate a match. In block 18, if no match is found at the regionalized database for the query, a null message is sent from the global database to the application with user interface indicating that there is no match. In block 19, the user is notified via the application with user interface of no match. In block 20, if a match is found at the regionalized database for the query, a network path associated with the result is returned from the regionalized database to the application. For example, the network path delivered to the networked device can be a shared folder on the network, root access to a server or a workstation, or a telephone number. In block 21, one or more files that are a target of the network path are opened. For example, the one or more files that are a target of the network path can be opened by a default application for a file type on the networked device. In one embodiment, the operating system of the networked device can automatically open a Doc file with Microsoft Word on the networked device and present the file to the user within the networked device user interface.

Figure 2:
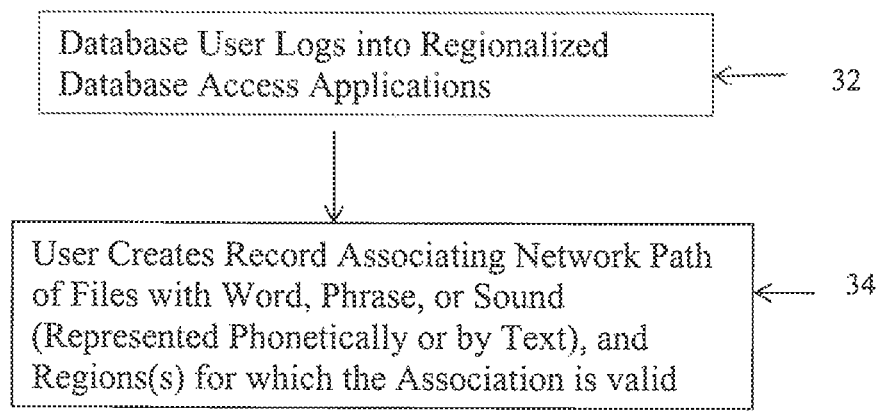
FIG. 2 is schematic diagram of a flow chart of a method for establishing a regionalized accessible database of records based on a specific sound or a specific combination of words, phrases and/or sounds resolution, and a location of the user.

FIG. 2 is a flow chart for a method for establishing a regionalized database of records based on a specific sound or a specific combination of words, phrases and/or sounds, and geographical region(s) where the records are considered valid.30. In block 32, a user of the regionalized database logs into an access application for the regionalized database. In block 34, the user of the regionalized database creates a record associating a network path of one or more files with a word, phrase or sound or a combination of a word, phrase or sound, and the geographical region or regions where the record is valid. The record of the regionalized database can be represented phonetically or by text, or other data formats.

Figure 3:
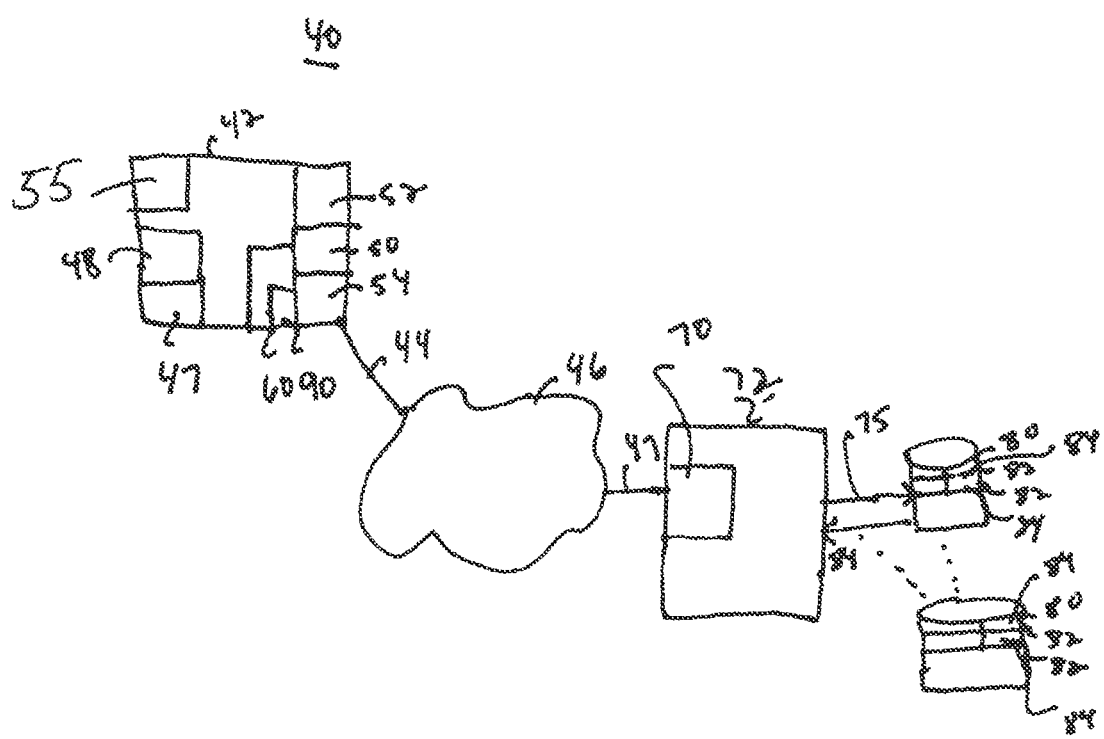
FIG. 3 is a schematic diagram of a system for regionalized resolution of a network path to one or more file types based on resolution of a specific sound or a specific combination of words, phrases and/or sounds, and a location of the user.

FIG. 3 is a schematic diagram of a system for system for regionalized resolution of a network path to one or more file types based on resolution of a specific sound or a specific combination of words, phrases and/or sounds, and a the location of the user 40. Networked device 42 connects over connection 44 to network 46. Connection 44 can be a wired or wireless connection. For example, network 46 can the internet or a local area network. Networked device 42 includes microphone 47 and speaker 48. Networked device can include processor 50, memory 52, location acquisition module 55, and operating system 54. Location acquisition module 55 can be implemented with features of a GPS. For example, networked device 42 can be a laptop, smart phone, AI assistant or tablet.

Application with user interface 60 runs on networked device 42. Application with user interface 60 connects through network 46 over connection 47 to conversion application 70. Conversion application 70 can run on conversion server 72. In one embodiment, application with a user interface 60 can connect to conversion application 70 via an advanced programmer interface (API) of application with user interface 60. Conversion server 72 can be a speech to text server and conversion application 70 can be a speech to text conversion application. Alternatively, conversion server 72 can convert sounds using a conversion application 70 including sound maps to transcribe audio of one or more sounds into a searchable format. A query from output 75 of conversion application 70 can be searched at one or more regionalized databases 80. Regionalized database 80 includes entries 82 of words, phrases, and sounds and valid geographical region(s) registered to network path 84. Regionalized database 80 is remote to networked device 42. Network path 84 can be returned to networked device 42. One or more files 90 that are a target of network path 84 can be opened at networked device 42 with application with user interface 60 using a respective file type. In one embodiment, operating system 54 of networked device 42 can automatically open file 90 which is the target of network path 84 on networked device 42 and present file 90 to the user within application with user interface 60.

Embodiments of the present invention can be implemented in connection with a special purpose or general purpose telecommunications device that include both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for regionalized resolution of a network path based on a request from a networked device, the method comprising the steps of:
   creating a record in a regionalized database associating a network path of one or more files with a word, phrase or sound or a combination of a word, phrase or sound, and one or more geographical regions;
   receiving at a user interface of the networked device audio of the word, phrase or sound or a combination thereof which are associated with the network path, and a geographic location of a user of the networked device;
   converting the audio to a searchable format;
   querying the searchable format of the converted audio and the geographic location of the user of the networked device in the regionalized database for a match of the record, when a match is found at the regionalized database for the query, the network path associated with the match is returned from the regionalized database to the networked device; and
   automatically opening the one or more files associated with the returned network path at the networked device wherein the match at the regionalized database of the geographical location of the user of the networked device targets the one or more files along with the one or more geographic regions for which the one or more files are valid.

2. The method of claim 1 wherein the audio is received at the networked device at an user interface application with the user interface, the audio and the geographic location of the networked device from the user interface application is delivered to a conversion application over a network via an advanced programmer interface (API), the conversion application executing the step of converting the audio to a searchable format.

3. The method of claim 2 wherein the user interface application is an executable program running on the networked device.

4. The method of claim 2 wherein the audio is delivered in real time from the user interface application to the conversion application.

5. The method of claim 2 wherein the audio is streamed, or delivered after recording, from the user interface application to the conversion application.

6. The method of claim 2 wherein the searchable format of the converted audio and location of the networked device are delivered to the regionalized database from the conversion application over a network.

7. The method of claim 2 wherein the searchable format of the converted audio and geographic location of the user of the networked device are delivered to the user interface application with the user interface and the user interface application delivers the searchable format of the converted audio and the location of the networked device to the regionalized database over a network.

8. The method of claim 1 wherein the audio is received at a microphone of the networked device.

9. The method of claim 1 wherein the step of converting the audio to a searchable format converts word or phrase to text.

10. The method of claim 1 wherein the step of converting the audio to a searchable format converts a sound to text utilizing a sound map.

11. The method of claim 10 wherein the network is the internet.

12. A system for regionalized resolution of a network path based on a request from a networked device, the system comprising:
   a regionalized database storing entries of relationships between a searchable format of audio and a network path to target one or more files along with one or more geographic regions for which the entries are valid;
   a user interface, the user interface receiving audio, the audio is a word, phrase or sound or a combination thereof; and
   a conversion server receiving the audio and a geographic location of the user from the networked device and converting the audio to a searchable format;
   wherein the converted audio in the searchable format and the geographic location of the user of the networked device are queried in the regionalized database for a match, when a match is found at the regionalized database for the query, the network path associated with the match is returned from the regionalized database to the networked device, and one or more files associated with the returned network path are automatically opened at the networked device upon receiving the returned network path at the networked device, wherein the match at the regionalized database of the geographical location of the user of the networked device targets the one or more files along with the one or more geographic regions for which the one or more files are valid.

13. The system of claim 12 wherein the audio is received at the networked device at an user interface application with the user interface executing on the networked device, the audio from the user interface application and the geographic location of the user of the networked device is delivered to the conversion server over a network via an advanced programmer interface (API) to a conversion application executing on the conversion server, the conversion application converting the audio to a searchable format.

14. The system of claim 13 wherein the audio is delivered in real time from the user interface application to the conversion application.

15. The system of claim 13 wherein the audio is streamed or delivered after recording from the user interface application to the conversion application.

16. The system of claim 12 wherein the audio is received at a microphone of the networked device.

17. The system of claim 12 wherein the geographic location of the user of the networked device is determined using a location acquisition module.

18. The system of claim 12 wherein the searchable format of audio is a conversion of the word or phrase to text and/or a conversion of the sound to text using a sound map.

19. The system of claim 12 wherein the networked device, the regionalized database and the conversion server are connected to one another over one or more networks.

20. The system of claim 19 wherein the network is the internet.

21. A non-transitory computer-readable medium having stored thereon a plurality of sequences of instructions, said instructions including sequences of instructions which, when executed by at least one processor, cause said processor to: receive audio, forward the audio and a geographic location of the user of the networked device to a conversion application to convert the audio to a searchable format, query the audio in a searchable format and the geographic location of a user of the networked device to entries in a regionalized database of preselected words, phrases or sounds and one or more regions where the entries are valid having a relationship to a network path associated with one or more files of interest; determine whether a match exists between the audio in a searchable format and the words, phrases or sounds and the geographic location of the user of the networked device having a relationship to the network path and when a match exists the network path associated with the match is returned from the regionalized database to the networked device, and the one or more files associated with the returned network path are automatically opened at the networked device upon receiving the returned network path at the networked device wherein the match at the regionalized database of the geographical location of the user of the networked device targets the one or more files along with the one or more geographic regions for which the one or more files are valid.

22. The non-transitory computer-readable medium of claim 21 wherein the audio is forwarded to the conversion application over a network via an advanced programmer interface (API).

* * * * *